United States Patent [19]

Nicol

[11] Patent Number: 5,067,581
[45] Date of Patent: Nov. 26, 1991

[54] ARTICULATED DRIVE WITH A BELT AND PULLEY ARRANGEMENT

[76] Inventor: Alexander N. Nicol, 102-104 Dampier Street, Barellan Point, Queensland 4305, Australia

[21] Appl. No.: 551,018

[22] Filed: Jul. 11, 1990

[30] Foreign Application Priority Data

Jul. 11, 1989 [AU] Australia .................. PJ5189

[51] Int. Cl.$^5$ .............. B60K 17/30; B62D 61/06; F16H 7/12
[52] U.S. Cl. .................. 180/254; 180/211; 180/263; 474/134; 474/137
[58] Field of Search ................ 180/253–254, 180/263, 265, 211; 56/11.8; 474/134, 137; 280/442

[56] References Cited

U.S. PATENT DOCUMENTS

| 1,016,787 | 2/1912 | Sewall | 474/134 X |
| 2,582,177 | 1/1952 | Swisher et al. | 180/211 X |
| 2,899,793 | 8/1959 | Swisher | 180/211 X |
| 2,935,333 | 5/1960 | Ekas . | |
| 3,112,594 | 12/1963 | Hallenbeck . | |
| 3,934,670 | 1/1976 | Medalen . | |
| 4,076,091 | 2/1978 | Forster . | |
| 4,084,395 | 4/1978 | Nannen . | |
| 4,263,977 | 4/1981 | Willett | 180/211 X |
| 4,633,962 | 1/1987 | Cox et al. | 280/442 X |

FOREIGN PATENT DOCUMENTS 54108 8/1980 Australia .
59483 2/1987 Australia .

Primary Examiner—Kenneth R. Rice
Assistant Examiner—Paul Dickson
Attorney, Agent, or Firm—Cushman, Darby & Cushman

[57] ABSTRACT

An articulated drive system for an articulated motor vehicle having a motor and a steerable drive wheel on opposite sides of a pivot axis. The system comprises a drive belt connecting a drive pulley and a load pulley. Idler pulleys and a belt tensioning pulley are located within the circuit of the drive belt. The idler pulleys and belt tensioning device provide for self-centering of the steerable drive wheel when the pivoted vehicle is in a pivoted state.

5 Claims, 4 Drawing Sheets

ARTICULATED DRIVE WITH A BELT AND PULLEY ARRANGEMENT

BACKGROUND OF THE INVENTION

1. Field of the Invention

The present invention relates to articulated drives and in particular, to an articulated drive which provides adjustable self-positioning of the alignment of the articulated sections whether or not power is applied.

2. Description of Related Art

It is known to have an articulated drive for any articulated or pivoted vehicle, device or contrivance on which power is transferred by belt or chains or other similar methods from any type of motor or manual power source which crosses the articulated pivot axis. Such a mechanism is shown and is used in a special purpose "ride on" motor mower. Such a mechanism could be also used on any other appropriate vehicle or device. Such a vehicle is fitted with a single wheel in either the front or rear, which provides steering and propulsion. A motor located on the other of the articulated vehicle drives the wheel by means of belts. The inherent problem with such a configuration is that the steering arm requires constant counter torque to oppose the natural tendency of the combined drive wheel and steering leg assembly to rotate around the steering axis when power is applied because the input shaft of the right angle drive unit is positioned in the axial line of the vertical articulated pivot. This has been demonstrated under actual working conditions as being a high torque.

SUMMARY OF THE INVENTION

It is an object of the present invention to provide an improved articulated drive which substantially overcomes or ameliorates the abovementioned disadvantage.

According to one aspect of the present invention there is disclosed an articulated drive system for an articulated motor vehicle having a power source and steerable traction means located on opposite sides of a pivot axis, said system comprising a drive belt means connecting a drive pulley means and a load pulley means, and an idler pulley means and a belt tensioning means, wherein said idler pulley means is located adjacent said pivot axis and said belt tensioning means provides a tension for self centering of said steerable traction means when the articulated vehicle is in a pivoted state.

BRIEF DESCRIPTION OF THE DRAWINGS

One embodiment of the invention will now be described with reference to the drawings in which.

DESCRIPTION OF THE PRIOR ART

Figure 1:
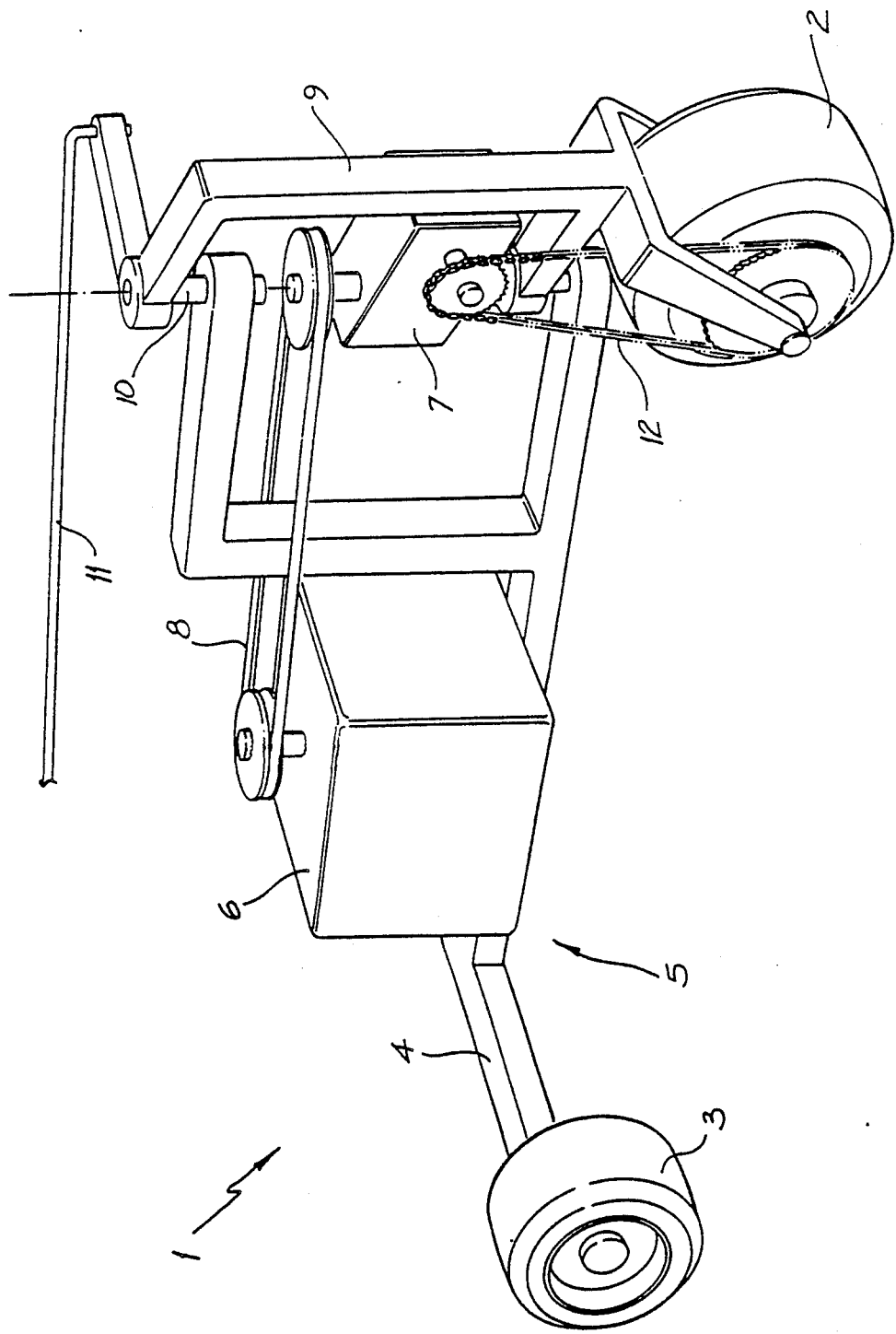
FIG. 1 is a perspective view of a tricycle vehicle using a prior art articulated drive.

A tricycle vehicle 1 of the prior art is illustrated in FIG. 1. The vehicle 1 comprises a front wheel 2 and two rear wheels 3. The vehicle has a rear section 5 comprising a frame 4 on which the rear wheels 3 are mounted. On the frame 4 is a motor 6 which is connected to a gear box 7 via a vee belt and pulley arrangement B.

The front wheel 2 is connected to a front frame 9 which pivots around an axle 10 which is the connection points between the front frame 9 and the rear frame 4. The front frame 9 has a steering arm 11.

The vehicle 1 operates in that the motor 6 provides a drive to the front wheel 2 via the vee belt and sprocket arrangement 8 and the gear box 7 and then through another chain and pulley arrangement 12. The inherent problems with such a configuration where the vertical pivot axis of the steering and drive leg passes through the input shaft of the gear box 7 is that a torque is produced in the steering and drive leg because the vertical input shaft of the gear box 7 is positioned in the axial line of the vertical articulated pivot.

DETAILED DESCRIPTION OF PREFERRED EMBODIMENTS

Figure 2:
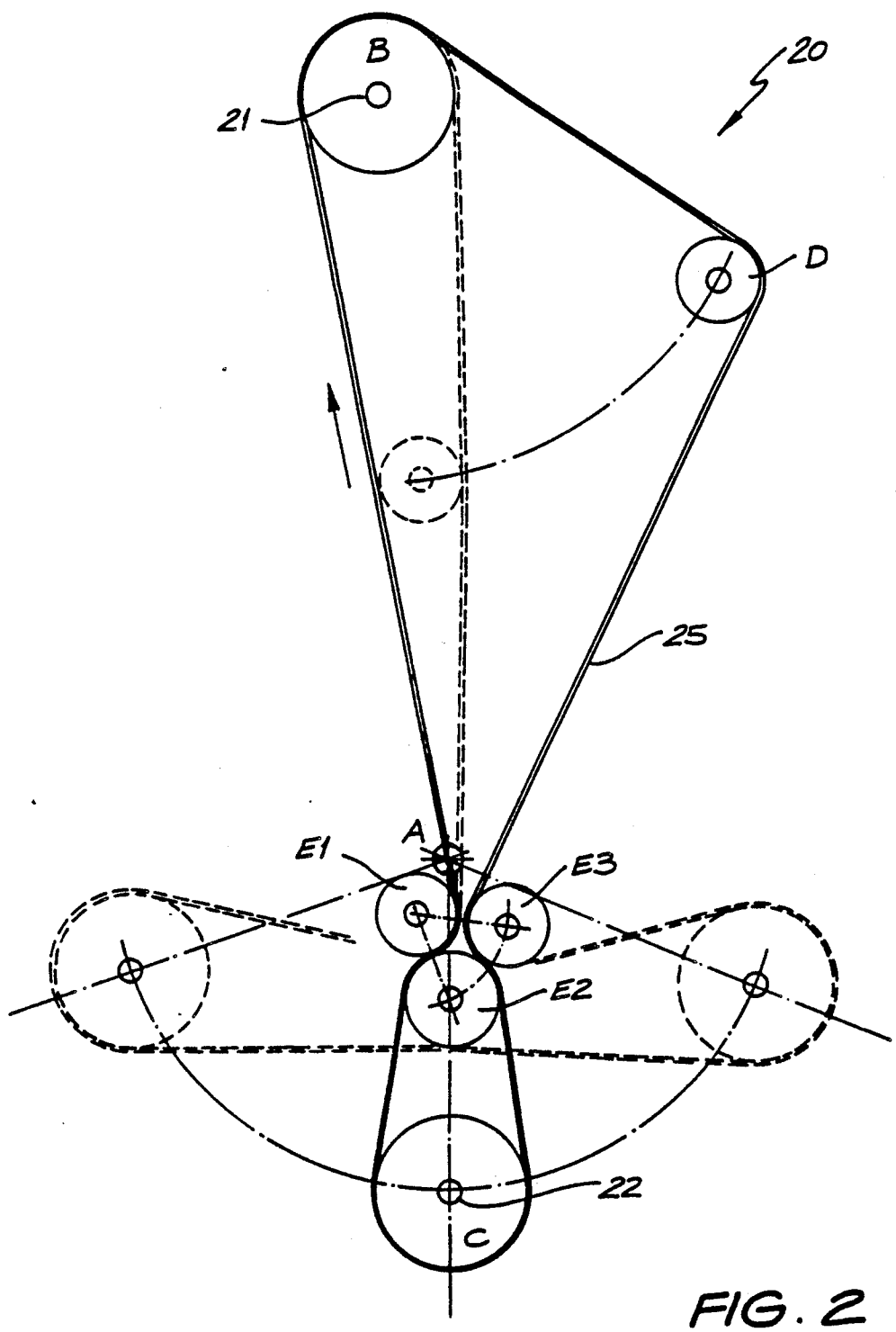
FIG. 2 is a schematic view of an articulated drive of the preferred embodiment.
Figure 4:
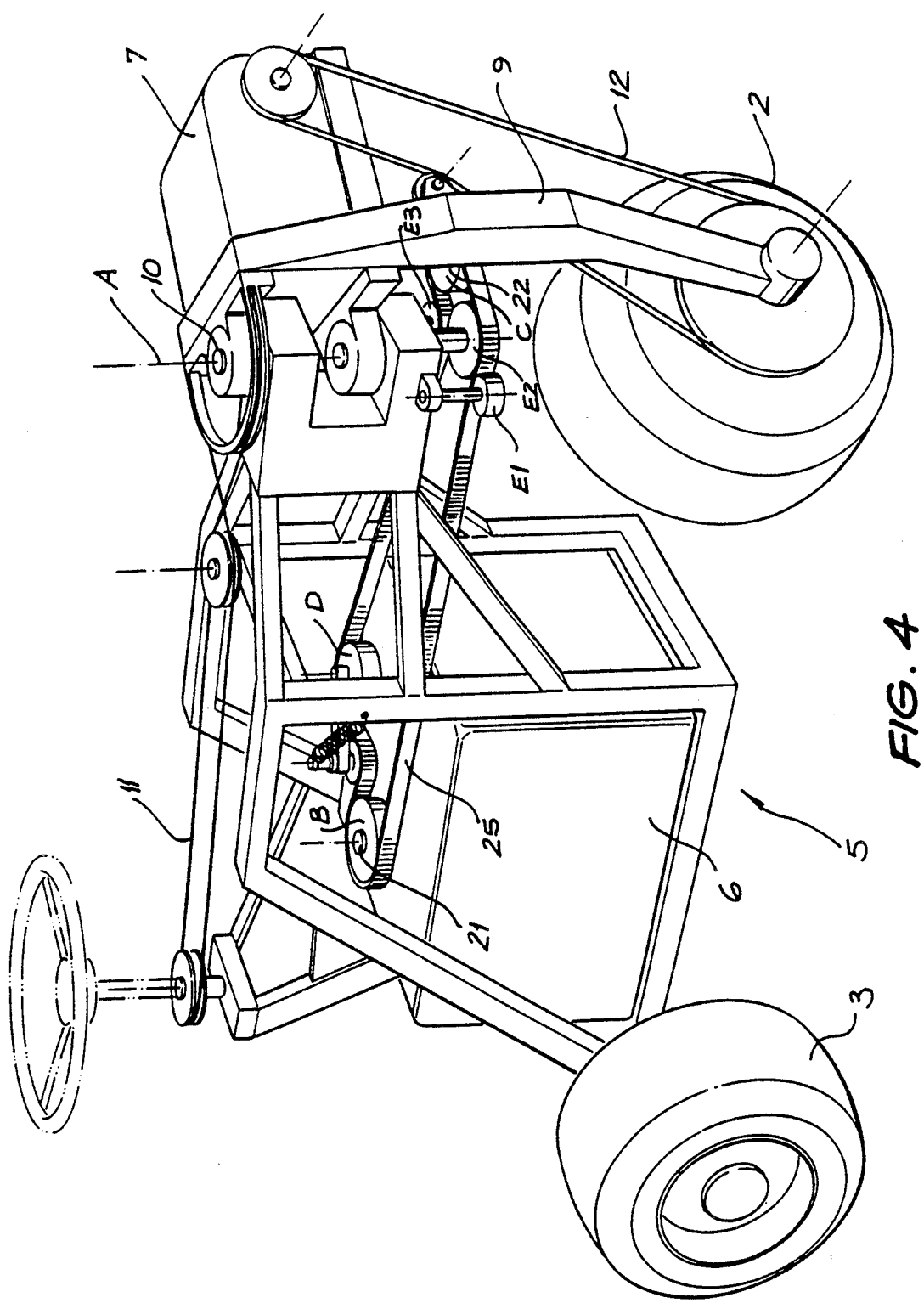
FIG. 4 is a perspective view of a tricycle vehicle using the articulated drive of the preferred embodiment.

The arrangement 20 of the present invention, as shown in FIG. 2, illustrates the vertical shaft 21 of the motor pulley B and the vertical shaft 22 of the gearbox of a right angle drive multi-speed gearbox C which is attached to a drive leg of an articulated vehicle. Illustrated in the drawings is the articulated vertical pivot axis A of the drive/steering leg according to the vehicle illustrated in FIGS. 1 and 4. This vertical pivot axis A is shown as a comparison. An automatic belt tensioner D provides the necessary energy to self-align or center the steering leg. Idler pulleys E1, E2, and E3 are positioned in a close triangular configuration mounted on an adjustable bracket which is attached to the motor chassis (not illustrated). The idler pulleys E1 and E3 are positioned as close as possible to each other and the pivot axis to align respectively the load and return sides of the Drive belt 25 as close as practical across pivot axis A. This reduces the undesirable induced torque to a minimum. Pulley E2 provides the self-alignment of the steering leg. These idler pulleys E1, E2 and E3 are adjustable and securable in positions in relation to each other and to the motor drive pulley B.

Figure 3:
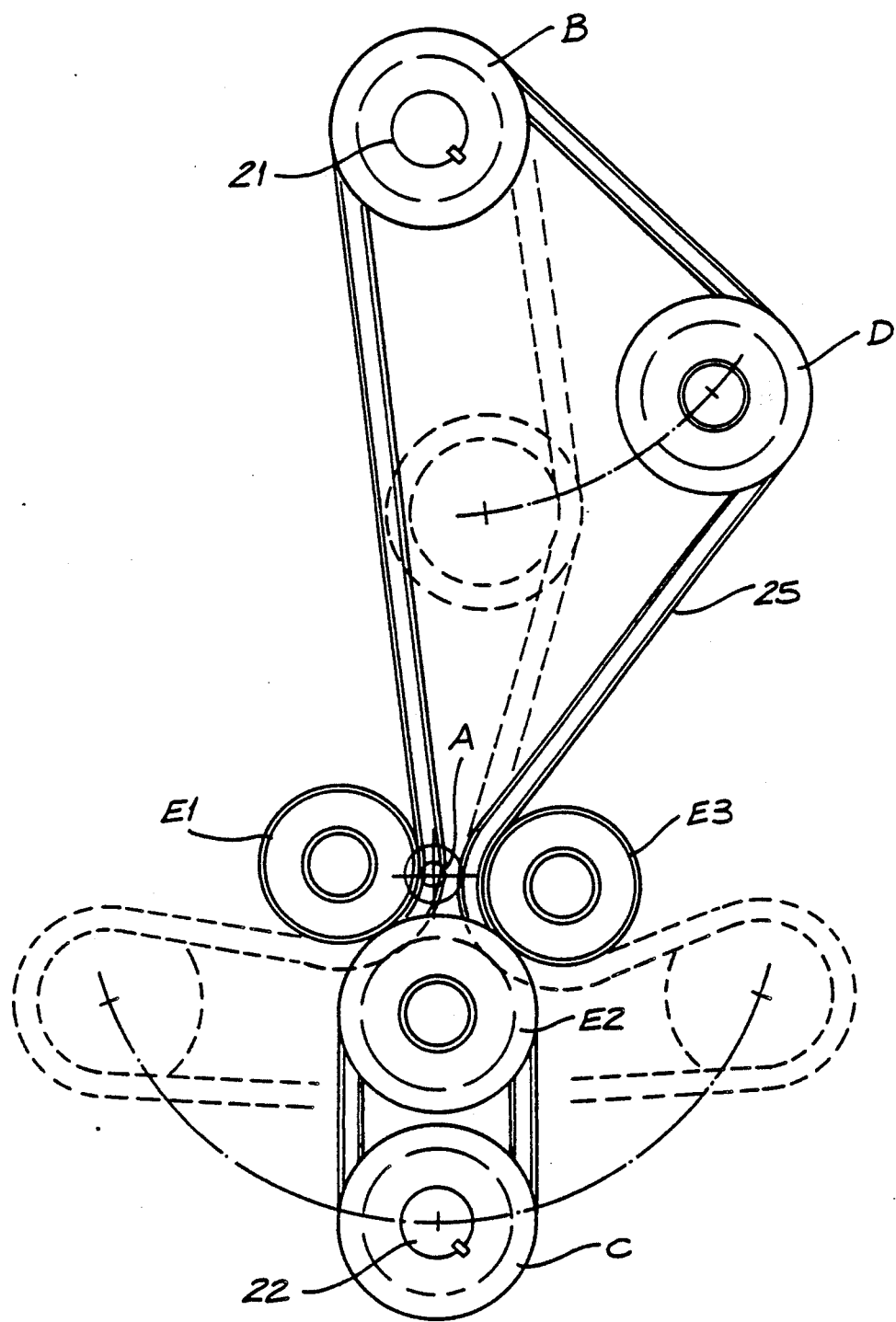
FIG. 3 is a schematic view of the scaled size of the configuration of the articulated drive of FIG. 2 for use on a ride-on mower.

As seen in the drawings, the shaft pulley of the gearbox C changes its position relative to the chassis by virtue of the fact that the steering and drive leg moves around the pivot of the articulated vehicle. The different positions of the gearbox pulley C are shown in hatch on the drawings of FIGS. 2 and 3.

In operation of the arrangement 20, the idler pulley E1, positioned as close as practical to the pivot axis 'A' aligns the drive belt 25 approximately across the pivot axis. With the idler pulley E1 fixed in that position, the idler pulleys E2 and E3 are positioned around the axis of the pulley E1 to set the desired self-centring position of the steering leg and lock in position. This adjustment sets the required alignment of the motor pulley B and the articulated pivot axis and pulley C.

When the steering leg is turned to change direction, the gearbox axis C moves in an arc around the pivot axis A altering the distance between the pulleys C and E2. The tensioner D moves to compensate for the change. When the steering mechanism is released from being held in a full lock position, the belt tensioner D pulls the gearbox pulley C towards a center position which is towards the idler pulley E2 until the distance between the two pulleys is at a minimum.

When the vehicle is stationary, the friction between the wheel and the ground would be too great for the self-centring to occur, however as soon as the vehicle is in motion the self-centring takes place.

It has been found that the greater the distance between the idler pulley E2 and the articulated pivot axis A of the drive leg, the greater the difference in distance between the gearbox pulley C and the idler pulley E2 when the driving leg is on a full lock. It also follows that the self-centring effect is increased. The respective diameters of pulleys E2 and C determine the preciseness of the self-aligning position. The smaller the diameter of E2 with respect to C, the more precise is the self-aligning position in practice.

It has been found that idler pulleys E1, E2 and E3 are the secret of the operation and need to be in close configuration to achieve as near as practical a mirror image of each side of the self-aligning position.

It is envisaged that the minimum full lock steering is at 70° from the center of the vehicle on either side of the vehicle.

The foregoing describes only one embodiment of the present invention, and modifications obvious to those skilled in the art can be made thereto without departing from the scope of the present invention. For example, the position of idler pulleys E1, E2 and E3 are variable according to the required self-centring of the steering leg.

What I claim is:

1. An articulated system for an articulated drive motor vehicle, said system comprising:

a power source and steerable driving means located on opposite sides of a pivot axis of said articulated motor vehicle, drive pulley means and load pulley means, drive belt means for enabling said drive pulley means to turn said load pulley means, and idler pulley means and belt tensioning means, said idler pulley means and said belt tensioning means being positioned between said drive pulley means and said load pulley means and being in contact with said drive belt means for cooperation therewith, said idler pulley means being adjacent to said pivot axis, and said belt tensioning means providing tension to said drive belt means for centering said steerable driving means when said articulated vehicle is in a pivoted state.

2. A system according to claim 1, said idler pulley means comprising at least three idler pulleys adjacent to one another, one of said idler pulleys being in substantially straight alignment with said drive pulley means and said load pulley means when said articulated motor vehicle is not in said pivoted state.

3. A system according to claim 2, said belt tensioning means comprising a pulley located between said idler pulley means and said drive pulley means, said belt tensioning means maintaining said tension in said drive belt means.

4. A system according to claim 3, said idler pulleys being movable to adjust said tension.

5. A system according to claim 4, said steerable driving means pivoting a minimum angle of 70° on either side of a center of said articulated motor vehicle.

* * * * *